United States Patent
Alfonso et al.

(10) Patent No.: US 12,450,538 B2
(45) Date of Patent: Oct. 21, 2025

(54) SYSTEM AND METHOD FOR DYNAMIC AUTOMATED WORK ASSIGNMENT

(71) Applicant: JPMorgan Chase Bank, N.A., New York, NY (US)

(72) Inventors: Jonathan Alfonso, Tampa, FL (US); Susheel Bonthala, Valrico, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 265 days.

(21) Appl. No.: 18/130,669

(22) Filed: Apr. 4, 2023

(65) Prior Publication Data

US 2024/0338624 A1    Oct. 10, 2024

(51) Int. Cl.
*G06Q 10/00* (2023.01)
*G06Q 10/0631* (2023.01)

(52) U.S. Cl.
CPC ............. *G06Q 10/06316* (2013.01); *G06Q 10/063112* (2013.01)

(58) Field of Classification Search
None
See application file for complete search history.

(56) References Cited

U.S. PATENT DOCUMENTS

| | | | | |
|---|---|---|---|---|
| 6,772,131 | B1 * | 8/2004 | Francis | G06Q 10/10 705/42 |
| 2011/0231331 | A1 * | 9/2011 | Smith | G06Q 30/0281 186/59 |
| 2016/0162478 | A1 * | 6/2016 | Blassin | G06Q 10/063112 706/12 |
| 2018/0123911 | A1 * | 5/2018 | Zhang | H04L 41/5019 |
| 2018/0349829 | A1 * | 12/2018 | Peterson | G06Q 10/063112 |
| 2022/0414566 | A1 * | 12/2022 | Napoli | G06Q 10/06311 |
| 2023/0394497 | A1 * | 12/2023 | Clark | G06Q 30/018 |
| 2024/0220893 | A1 * | 7/2024 | Cooks | G06Q 10/06316 |

FOREIGN PATENT DOCUMENTS

CN    1309218 C  *  4/2007  ............. H04L 47/20

OTHER PUBLICATIONS

A. I. Chittilappilly, L. Chen and S. Amer-Yahia, "A Survey of General-Purpose Crowdsourcing Techniques," in IEEE Transactions on Knowledge and Data Engineering, vol. 28, No. 9, pp. 2246-2266, Sep. 1, 2016, doi: 10.1109/TKDE.2016.2555805. (Year: 2016).*

* cited by examiner

*Primary Examiner* — Matheus Ribeiro Stivaletti
(74) *Attorney, Agent, or Firm* — GREENBLUM AND BERNSTEIN, P.L.C.

(57) ABSTRACT

A method and system for performing automated work assignment are disclosed. The method includes storing information of a case and operator, determining a requirement and restriction of the case, and determining, using a machine learning algorithm, availability of operator candidates matching the requirement and the restriction of the case. The method further includes assigning the case to a work bucket of the operator based on the requirement and restriction of the case, tracking a progress of the case and updating availability information of the case that is assigned. Once the case is determined to be completed, calculating attributes of performance of the operator when the case is determined to have been completed, inputting the calculated attributes of performance to the machine learning algorithm, and updating the machine learning algorithm with the calculated attributes of performance for subsequent processing by the machine learning algorithm.

17 Claims, 8 Drawing Sheets

SYSTEM AND METHOD FOR DYNAMIC AUTOMATED WORK ASSIGNMENT

TECHNICAL FIELD

This disclosure generally relates to a system and method for facilitating dynamic automated work assignment across the globe using one or more machine learning (ML) or artificial intelligence (AI) algorithms in view of real-time availability of resources as well as localized restrictions and system resources.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

For large organizations, there are many areas of inefficiencies that may impact operational and resource effectiveness. In order for such organizations to operate, large projects may be broken down into smaller works or cases that may be processed by one or more teams of operators or workers. As these works may be interrelated, accurate coordination and close management of work assignments are required. However, incorrect assignment and unbalanced work assignment jeopardize proper operation of organizations, which may lead to unexpected downtimes and underutilization of their resources.

SUMMARY

According to an aspect of the present disclosure, a method for performing automated work assignment is provided. The method includes receiving, by a processor, information of a case to be assigned: storing, in a memory, the received information of the case: storing, in the memory, information of an operator; retrieving, from the memory, the information of the case and the information of the operator: determining, by the processor and based on the retrieved information of the case, at least one requirement of the case and at least one restriction of the case: determining, using a machine learning algorithm executed by the processor, availability of operator candidates matching the at least one requirement of the case and the at least one restriction of the case, wherein the operator candidates include the operator; assigning, by the processor, the case to a work bucket of the operator among the operator candidates to the case based on the at least one requirement of the case and the at least one restriction of the case: tracking, by the processor, a progress of the case: updating, by the processor and in the memory, availability of the case that is assigned: determining, by the processor, whether the case is completed: calculating, by the processor, attributes of performance of the operator when the case is determined to have been completed: and inputting, by the processor, the calculated attributes of performance to the machine learning algorithm and updating the machine learning algorithm with the calculated attributes of performance for subsequent processing by the machine learning algorithm.

According to another aspect of the present disclosure, the method further includes monitoring, by the processor, an availability of the operator assigned to the case: detecting, by the processor, a change in the availability of the operator assigned: removing, by the processor, assignment of the case from the work bucket of the operator; and updating the availability of the case for reassignment of the case to another operator.

According to another aspect of the present disclosure, the at least one requirement of the case includes a service level agreement or cutoff time.

According to yet another aspect of the present disclosure, the at least one requirement of the case is an operator skill.

According to another aspect of the present disclosure, the at least one restriction of the case is a geographic restriction.

According to a further aspect of the present disclosure, the at least one requirement of the case is a language.

According to yet another aspect of the present disclosure, the availability of the operator is monitored based on scanning of a security badge into a facility.

According to a further aspect of the present disclosure, the availability of the operator is monitored based on online presence.

According to another aspect of the present disclosure, the availability of the operator is monitored in real time.

According to a further aspect of the present disclosure, the at least one work bucket includes a plurality of work buckets, each work bucket of the plurality of work buckets correspond to a specific skill of the operator.

According to a further aspect of the present disclosure, the method further includes generating a case allocation matrix based on the assigning of the case to the work bucket: and displaying, on a display, the generated case allocation matrix.

According to a further aspect of the present disclosure, the assigning of the case to the work bucket is performed based on at least a service level agreement associated with the case.

According to a further aspect of the present disclosure, the assigning of the case to the work bucket is further performed based on availability of the operator.

According to a further aspect of the present disclosure, the availability of the operator is determined based on case load.

According to a further aspect of the present disclosure, the availability of the operator is determined based on geography.

According to a further aspect of the present disclosure, the availability of the operator is determined based on a time zone.

According to a further aspect of the present disclosure, the assigning of the case to the work bucket is performed in response to a request from the operator.

According to a further aspect of the present disclosure, the assigning of the case to the work bucket is performed automatically based on case load distribution.

According to another aspect of the present disclosure, a non-transitory computer readable storage medium that stores a computer program for performing automated work assignment is provided. The computer program, when executed by a processor, causes a system to perform multiple processes including: receiving, by the processor, information of a case to be assigned: storing, in a memory, the received information of the case; storing, in the memory, information of an operator; retrieving from the memory, the information of the case and the information of the operator: determining, by the processor and based on the retrieved information of the case, at least one requirement of the case and at least one restriction of the case; determining, using a machine learning algorithm executed by the processor, availability of operator candidates matching the at least one requirement of the case and the at least one restriction of the case, wherein the operator candidates include the operator:

assigning, by the processor, the case to a work bucket of the operator among the operator candidates to the case based on the at least one requirement of the case and the at least one restriction of the case; tracking, by the processor, a progress of the case: updating, by the processor and in the memory, availability of the case that is assigned: determining, by the processor, whether the case is completed: calculating, by the processor, attributes of performance of the operator when the case is determined to have been completed; and inputting by the processor, the calculated attributes of performance to the machine learning algorithm and updating the machine learning algorithm with the calculated attributes of performance for subsequent processing by the machine learning algorithm.

According to an aspect of the present disclosure, a system to provide for performing automated work assignment is provided. The system includes a memory, a display and a processor. The processor is configured to perform: receiving information of a case to be assigned: storing the received information of the case: storing information of an operator: retrieving the information of the case and the information of the operator; determining, based on the retrieved information of the case, at least one requirement of the case and at least one restriction of the case; determining, using a machine learning algorithm, availability of operator candidates matching the at least one requirement of the case and the at least one restriction of the case, wherein the operator candidates include the operator; assigning the case to a work bucket of the operator among the operator candidates to the case based on the at least one requirement of the case and the at least one restriction of the case; tracking a progress of the case: updating availability information of the case that is assigned: determining whether the case is completed: calculating attributes of performance of the operator when the case is determined to have been completed: and inputting the calculated attributes of performance to the machine learning algorithm and updating the machine learning algorithm with the calculated attributes of performance for subsequent processing by the machine learning algorithm.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
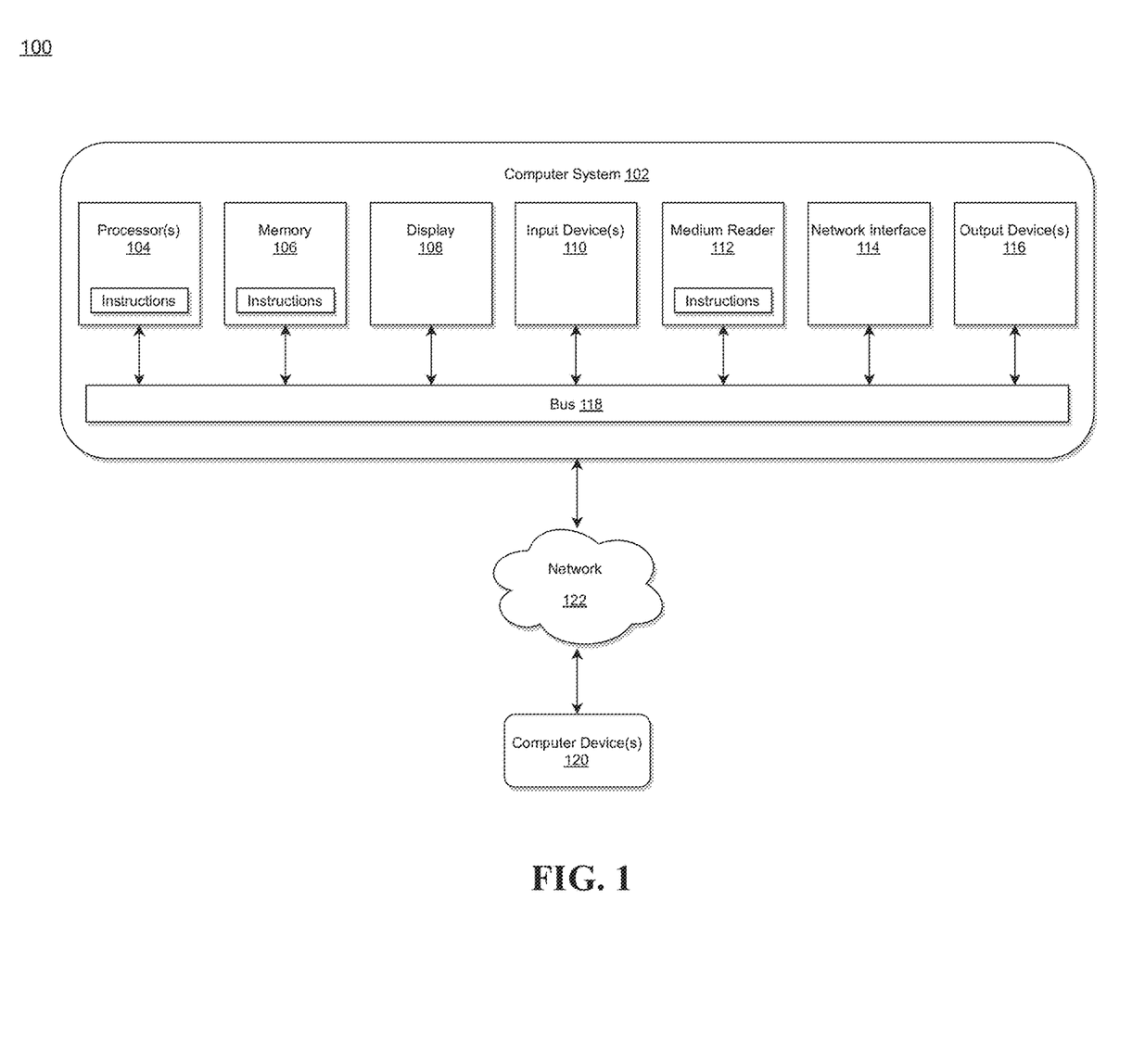
FIG. 1 illustrates a computer system for implementing a smart work assignment (SWA) system in accordance with an exemplary embodiment.

FIG. 1 illustrates a computer system for implementing a smart work assignment (SWA) system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed)

network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
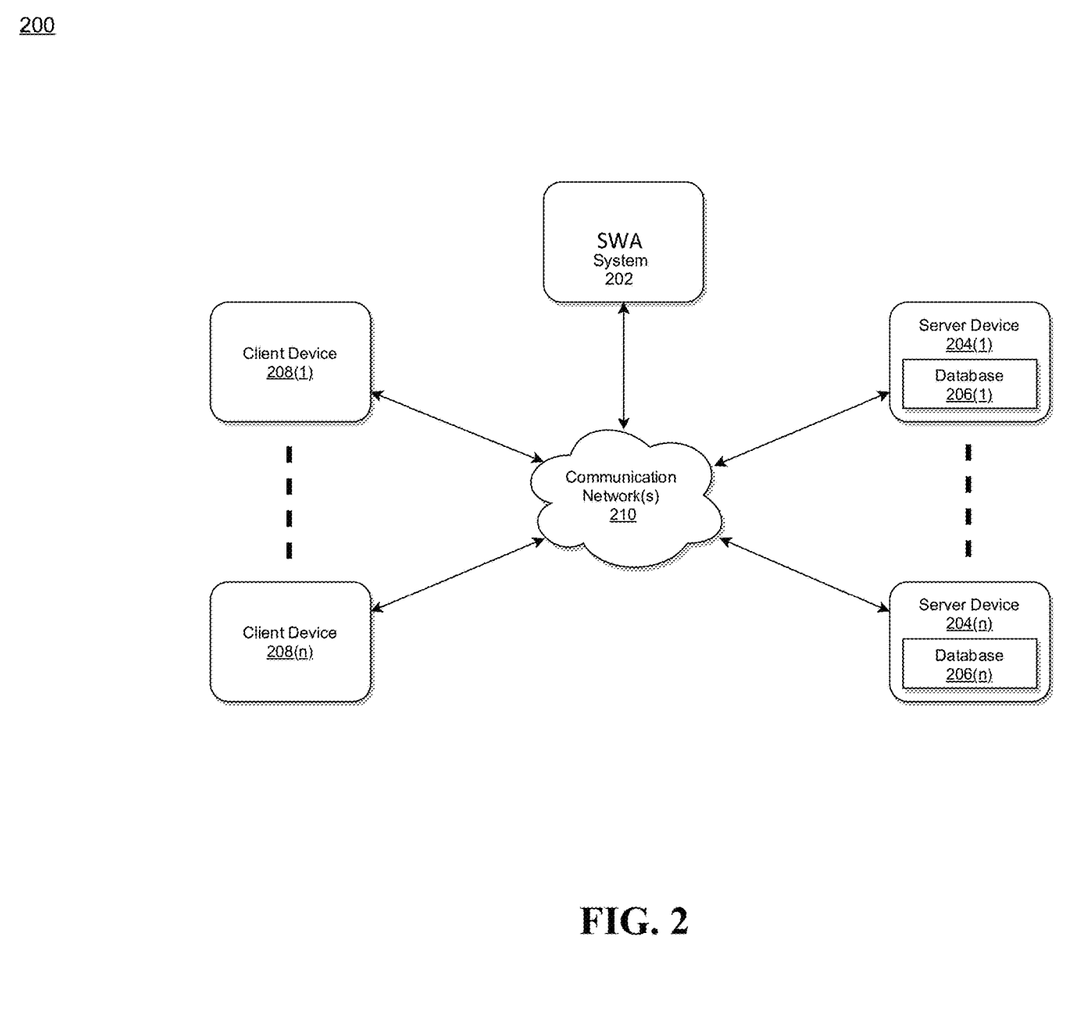
FIG. 2 illustrates an exemplary diagram of a network environment with a SWA system in accordance with an exemplary embodiment.

FIG. 2 illustrates an exemplary diagram of a network environment with a SWA system in accordance with an exemplary embodiment.

A smart work assignment (SWA) system 202 may be implemented with one or more computer systems similar to the computer system 102 as described with respect to FIG. 1.

The SWA system 202 may store one or more applications that can include executable instructions that, when executed by the SWA system 202, cause the SWA system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the SWA system 202 itself, may be located in virtual server(s) running in a cloud-based computing environment rather than being tied to one or more specific physical network computing devices. Also, the application(s) may be running in one or more virtual machines (VMs) executing on the SWA system 202. Additionally, in one or more embodiments of this technology, virtual machine(s) running on the SWA system 202 may be managed or supervised by a hypervisor.

In the network environment 200 of FIG. 2, the SWA system 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the SWA system 202, such as the network interface 114 of the computer system 102 of FIG. 1, operatively couples and communicates between the SWA system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SWA system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SWA system 202 may be a standalone device or integrated with one or more other devices or apparatuses, such as one or more of the server devices 204(1)-204(n), for example. In one particular example, the SWA system 202 may be hosted by one of the server devices 204(1)-204(n), and other arrangements are also possible. Moreover, one or more of the devices of the SWA system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SWA system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SWA system 202 that may efficiently provide a platform for implementing a cloud native SWA system module, but the disclosure is not limited thereto.

The client devices 208(1)-208(n) may run interface applications, such as standard web browsers or standalone client applications, which may provide an interface to communicate with the SWA system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SWA system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SWA system 202, the server devices 204(1)-204(n), or the client devices 208(1)-208(n), for example, may be configured to operate as virtual instances on the same physical machine. For example, one or more of the SWA system 202, the server devices 204(1)-204(n), or the client devices 208(1)-208(n) may operate on the same physical device rather than as separate devices communicating through communication network(s) 210. Additionally, there may be more or fewer SWA system 202, server devices 204(1)-204(n), or client devices 208(1)-208(n) than illustrated in FIG. 2. According to exemplary embodiments, the SWA system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
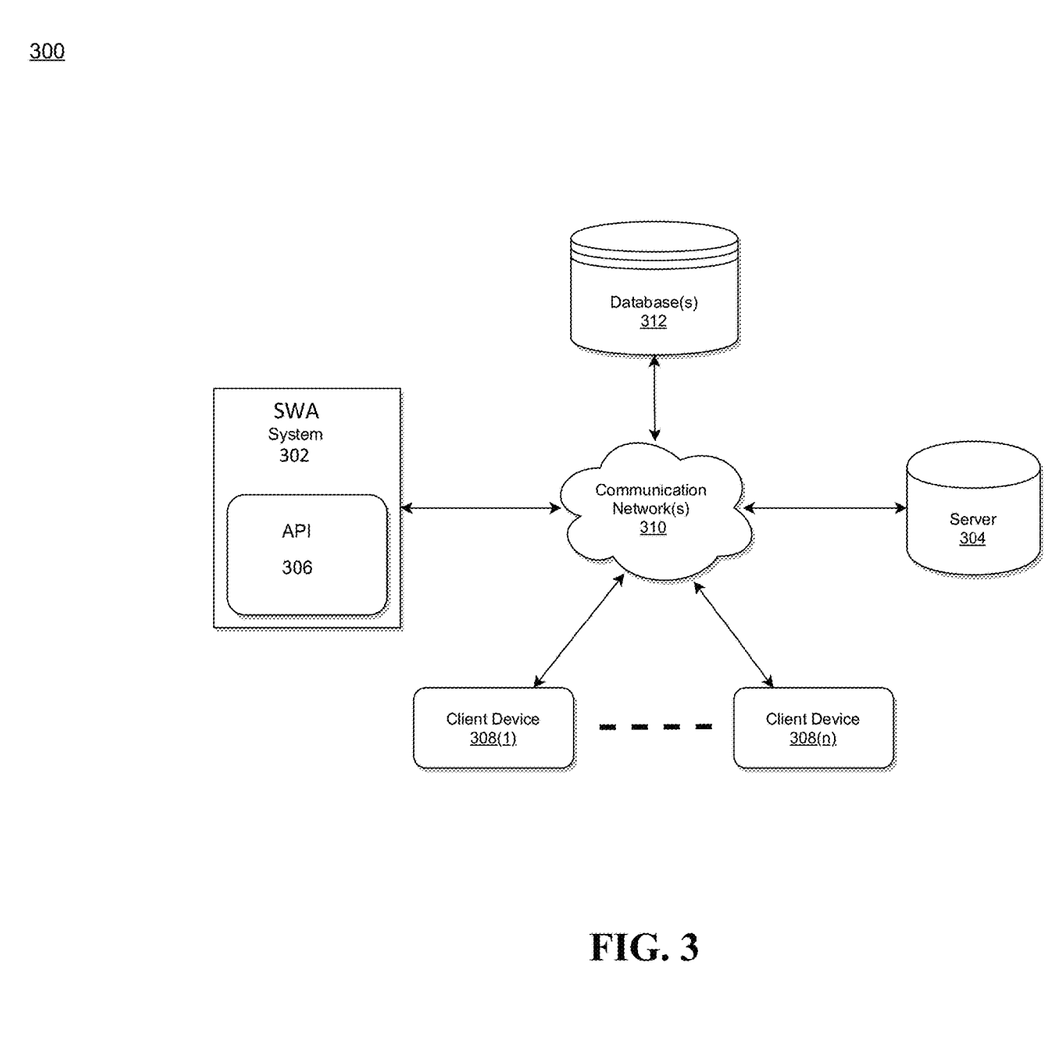
FIG. 3 illustrates a system diagram for implementing a SWA system in accordance with an exemplary embodiment.

FIG. 3 illustrates a system diagram for implementing a SWA system in accordance with an exemplary embodiment.

As illustrated in FIG. 3, the system 300 may include a SWA system 302 within which a group of API modules 306 is embedded, a server 304, a database(s) 312, a plurality of client devices 308(1) . . . 308(n), and a communication network 310.

According to exemplary embodiments, the SWA system 302 including the API modules 306 may be connected to the server 304, and the database(s) 312 via the communication network 310. Although there is only one database that has been illustrated, the disclosure is not limited thereto. Any number of databases may be utilized. The SWA system 302 may also be connected to the plurality of client devices 308(1) . . . 308(n) via the communication network 310, but the disclosure is not limited thereto.

According to exemplary embodiment, the SWA system 302 is described and shown in FIG. 3 as including the API modules 306, although it may include other rules, policies, modules, databases, or applications, for example. According to exemplary embodiments, the database(s) 312 may be embedded within the SWA system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable SWA system as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources.

The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the SWA system 302. In this regard, the plurality of client devices 308(1) . . . 308(n) may be "clients" of the SWA system 302 and are described herein as such. Nevertheless, it is to be known and understood that the plurality of client devices 308(1) . . . 308(n) need not necessarily be "clients" of the SWA system 302, or any entity described in association therewith herein. Any additional or alternative relationship may exist between either or both of the plurality of client devices 308(1) . . . 308(n) and the SWA system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the SWA system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The SWA system 302 may be the same or similar to the SWA system 202 as described with respect to FIG. 2, including any features or combination of features described with respect thereto.

Figure 4:
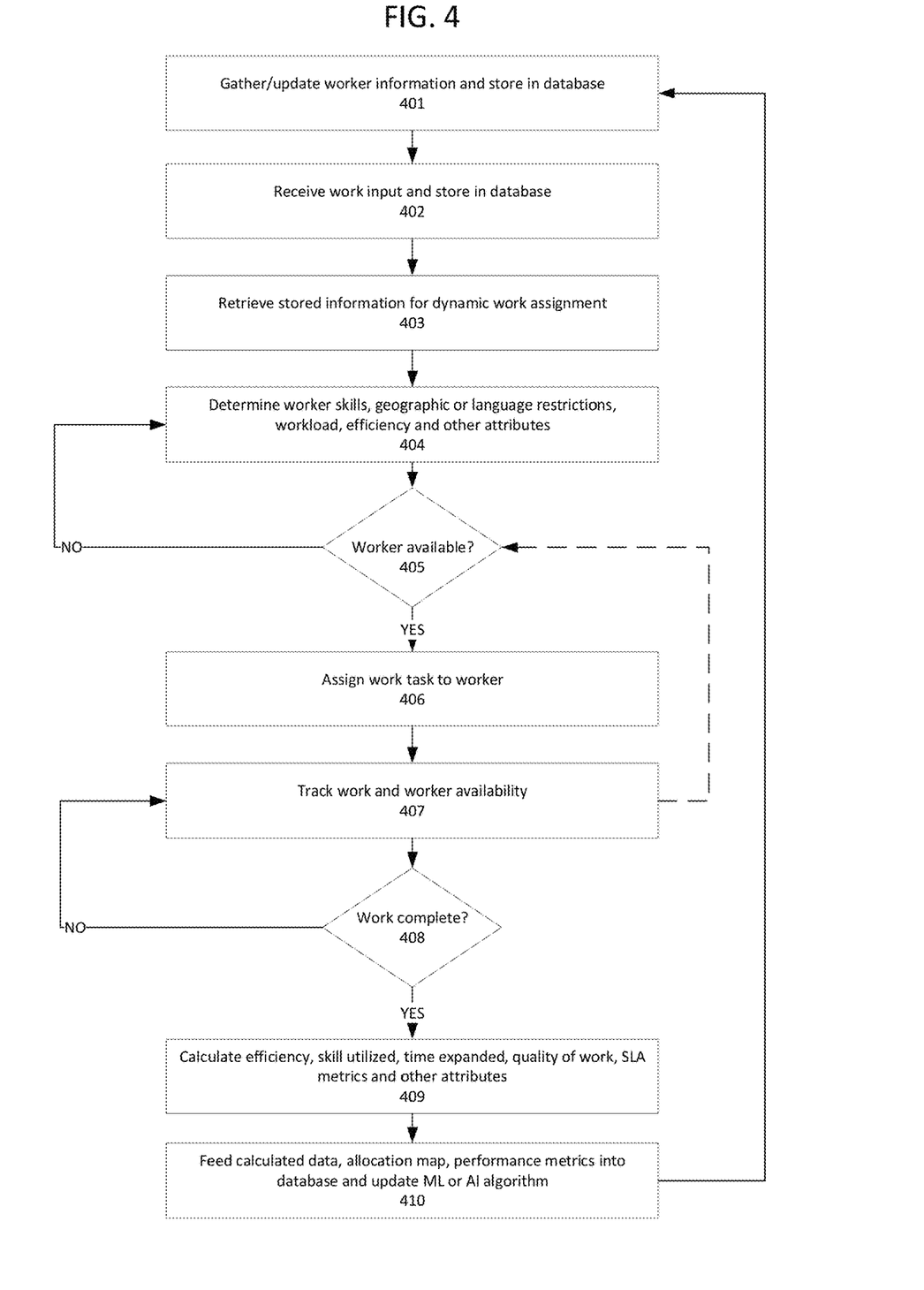
FIG. 4 illustrates a method for performing dynamic automated work assignment in accordance with an exemplary embodiment.

FIG. 4 illustrates a method for performing dynamic automated work assignment in accordance with an exemplary embodiment.

In operation 401, worker information may be gathered and stored in a database. In an example, worker information may include biographic/identifying information of a worker or operator, such as unique operator security identifier, name, age, sex, nationality, citizenship, languages, address, contact information and the like. Worker information may additionally include entitlement information. In an example, entitlement information may include a listing of units for each line of business that a respective worker is authorized to work in. Moreover, the worker information may include a listing of skills that the operator or the worker, and corresponding level of experience or expertise. In addition to the above, the worker information may also include efficiency information of the worker. According to exemplary aspects, efficiency information may include calculated average time for cases processed by the worker. In an example, the average time may be calculated for certain period of time, such as 7 days. Moreover, the average time may be calculated for specific skill set. If the worker information is already stored, the worker information may be updated with newer information (e.g., upon completion of a project or a case). Although a single database is referenced above, aspects of the present disclosure are not limited thereto, such that a system of databases may be utilized. For example, a database may be assigned to a particular geographic region, country, continent or the like of a respective worker.

In operation 402, work information is received and stored in a database. According to exemplary aspects, work information may include a case identifier, service level agreement (SLA)/cutoff (e.g., 2 hour SLA, 7:30 PM EST cutoff), work basket or bucket, one or more skills assigned to the case, unit requesting the work, one or more restrictions and the like. In an example, the case identifier may be a unique combination of alphanumeric characters assigned to a case or work assignment. SLA/cutoff may be defined by a business controlled tables based on multiple criteria. According to exemplary aspects, SLA/cutoff is expected to be enforced and may require strict adherence to avoid potential downstream impact. Also in an example, work basket or bucket may refer to a virtual container to which a case may be assigned. Skills may include one or more specific skills required for performing the work. In an example, the skills may additionally indicate required level of proficiency, experience and/or efficiency. Unit may indicate one or more units within a line of business for which the work is being requested. Further, one or more restrictions may refer to a restriction present for the work to be assigned. For example, if the work includes data which is regulatorily restricted to a particular geography (e.g., country), then only workers residing in such geography may be assigned to meet regulatory requirements. Although a single database is referenced above, aspects of the present disclosure are not limited thereto, such that a system of databases may be utilized. For example, a database may be assigned to a particular geographic region, country, continent or the like of a respective work or assignment.

In operation 403, work information and worker information may be retrieved from their respective databases for performing dynamic or real-time work assignment.

In operation 404, one or more restrictions may be determined for possible restrictions. For example, if the case or work requires someone who speaks English, a foreign operator or worker without such language skills may be restricted from being selected. According to exemplary aspects, potential worker assignments may be initially generated based on one or more requirements in work information, such as required skills, and then filtered based on one or more restrictions, such as current workload of a potential worker or assignment. In an example, restrictions may include, without limitation, worker skills, geographic or language restrictions, workload, efficiency and other attributes.

In operation 405, worker availability may be determined for determining of possible work assignment. According to exemplary aspects, worker availability may be determined based on a potential worker's vacation schedule, travel schedule, doctor appointments, maternity/paternity leave, worker's online status, worker's security or identification badge scanning at a work facility and the like. Further, worker availability may be tracked in real-time, such that if the worker leaves work during work hours, worker availability information may be updated immediately.

In operation 406, work or case is assigned to an available worker or operator meeting all of the requirements of the work without restriction. In an example, if the work or case is assigned to a worker or operator, the work or case may be placed in one or more of work baskets or buckets of the worker or operator. Further, based on the work assignment, worker or operator allocation map may be updated to reflect the work or case assignment. Further, the work may be removed from assignment to avoid duplicative work assignments.

Some or all of the retrieved data may be processed by one or more machine learning (ML) or artificial intelligence (AI) algorithms executed by a processor for dynamically assigning a work or case to one or more workers. According to exemplary aspects, ML or AI algorithms utilized in the present disclosure may not be limited to a particular geography, country, time zone or the like, allowing work to be facilitated, assigned and managed throughout entirety (e.g., 24 hours per day). For example, a case originating from a U.S. operating unit requiring an immediate turnaround for a case that is opened at evening hours may be assigned to an operator with English skills residing in another country.

In an example, AI or ML algorithms may be generative, in that the AI or ML algorithms may be executed to perform data pattern detection, and to provide an output based on the data pattern detection. More specifically, an output may be provided based on a historical pattern of data, such that with more data or more recent data, more accurate outputs may be provided. Accordingly, the ML or AI models may be constantly updated after a predetermined number of runs or iterations are initially performed to provide initial training. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment the ML or AI models may be generated using at least one from among an artificial neural network technique, a decision tree technique, a support vector machines technique, a Bayesian network technique, and a genetic algorithms technique.

In operation 407, once the work or case is assigned to a worker or operator, progress of work is tracked with respect to the SLA/cutoff until work is completed. Further, worker availability is additionally tracked to ensure that the work or case progresses to completion according to the SLA/cutoff. In the event that the worker's availability is unexpectedly modified due to a family emergency, health issues or other events, the method may step back to operation 405 to identify another worker or operator to assign to the work. Further, although not explicitly illustrated, work may also be reassigned when a worker is unable to make sufficient progress (e.g., meeting of a milestone) on the assigned work in view of the SLA/cutoff requirements.

In operation 408, a determination of whether the work is completed, as a whole or certain milestones, is determined. According to exemplary aspects, such determination may be made at predetermined intervals, or frequency may be determined based on proximity to the cutoff time/date for the assigned work and progress of the work. If the work is determined not to have been completed, the method proceeds back to operation 407 to continue tracking or monitoring of work progress and worker availability.

In operation 408, when the work is determined to have been completed, the method proceeds to operation 409. In operation 409, performance of the work and worker may be calculated. According to exemplary aspects, efficiency, skill utilized, time expanded, quality of work, SLA metrics and other attributes may be calculated.

In operation 410, calculated data, allocation map, and performance metrics are fed into a database and are utilized to update the ML or AI algorithm for subsequent work assignment operations. According to exemplary aspects, by updating the ML or AI algorithm based on performance on the assigned work, such as efficiency, number of hours required, system resource expanded, and the like, a more accurate work assignment may be performed in a subsequent work assignment operation.

Figure 5:
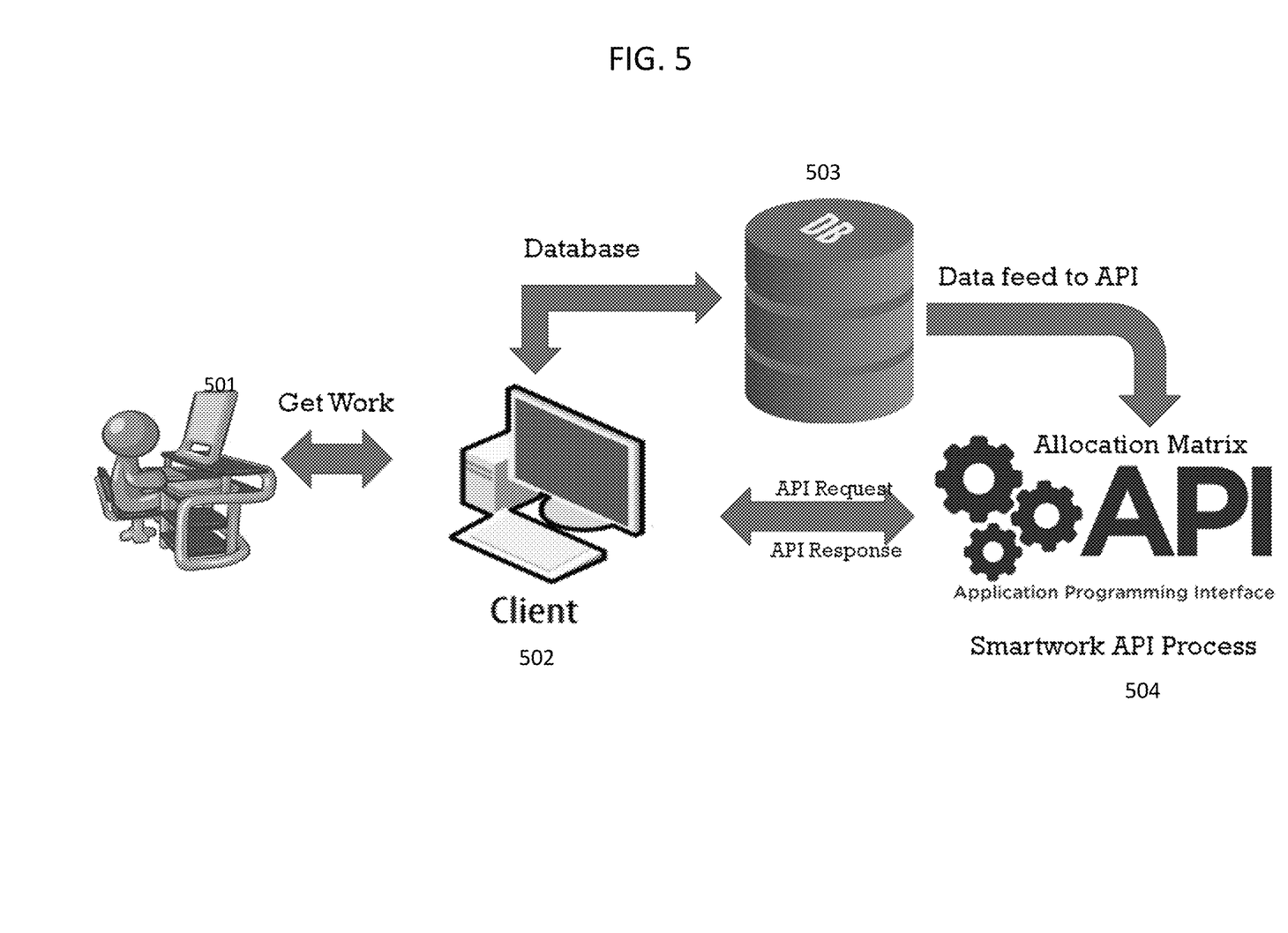
FIG. 5 illustrates a smart work API process in a SWA system in accordance with an exemplary embodiment.

FIG. 5 illustrates a smart work application programming interface (API) process in a SWA system in accordance with an exemplary embodiment.

According to an exemplary aspect, a SWA system may include interactions between one or more workstations 501 of workers or operators, a work assignment client device 502, a system of network databases 503, and an allocation matrix API 504. In an example, an operator may submit a get work command via his or her workstation 501 to the work assignment client device 502. The work assignment client device 502 may feed the requesting worker or operation information to the system of network databases 503.

Further, the work assignment client device 502 may submit an API request to the allocation matrix API 504 for obtaining work assignment for the requesting worker or operator. In response, the allocation matrix API 504 retrieves information of various works or cases that have yet to be assigned as well as the worker information and dynamically assigns a work to the requesting worker or operator. According to exemplary aspects, work assignment in consideration of skill requirements, SLA/cutoff, worker proficiency or efficiency, worker schedule, and various restrictions (e.g., nationality, geography, system requirements or the like) may be performed. Once an appropriate work is identified for assignment in view of the above noted factors, the work may be assigned to a work basket of the requesting worker or operator.

Once an available work or case is assigned to the requesting operator or the requesting operator's work basket, availability of the work that is assigned to the requesting operator is modified in the system of network databases 503 to indicate assignment to avoid duplicate assignment of the same work. Further, the allocation matrix API 504 may transmit an API response to the work assignment client device 502. The work assignment client device 502 in receipt of the API response, requests update to the system of network database 503 to indicate the work assignment to the requesting operator and update the requesting operator's availability and schedule in view of the work assignment. Further, the work assignment client device 502 may notify the requesting operator of the work assignment. Once the work is assigned to the operator, progress of the assigned work or case may be tracked to ensure that work may be completed within the SLA/cutoff defined for the assigned work.

Although aspects of the present disclosure have been described with respect to a pull request from a worker or operator, aspects of the present disclosure are not limited thereto, such that the work assignment client device 502 may proactively monitor work basket queue of one or more operators for determination of case load distribution and dynamically and automatically assign new work or case base on worker or operator availability.

Figure 6:
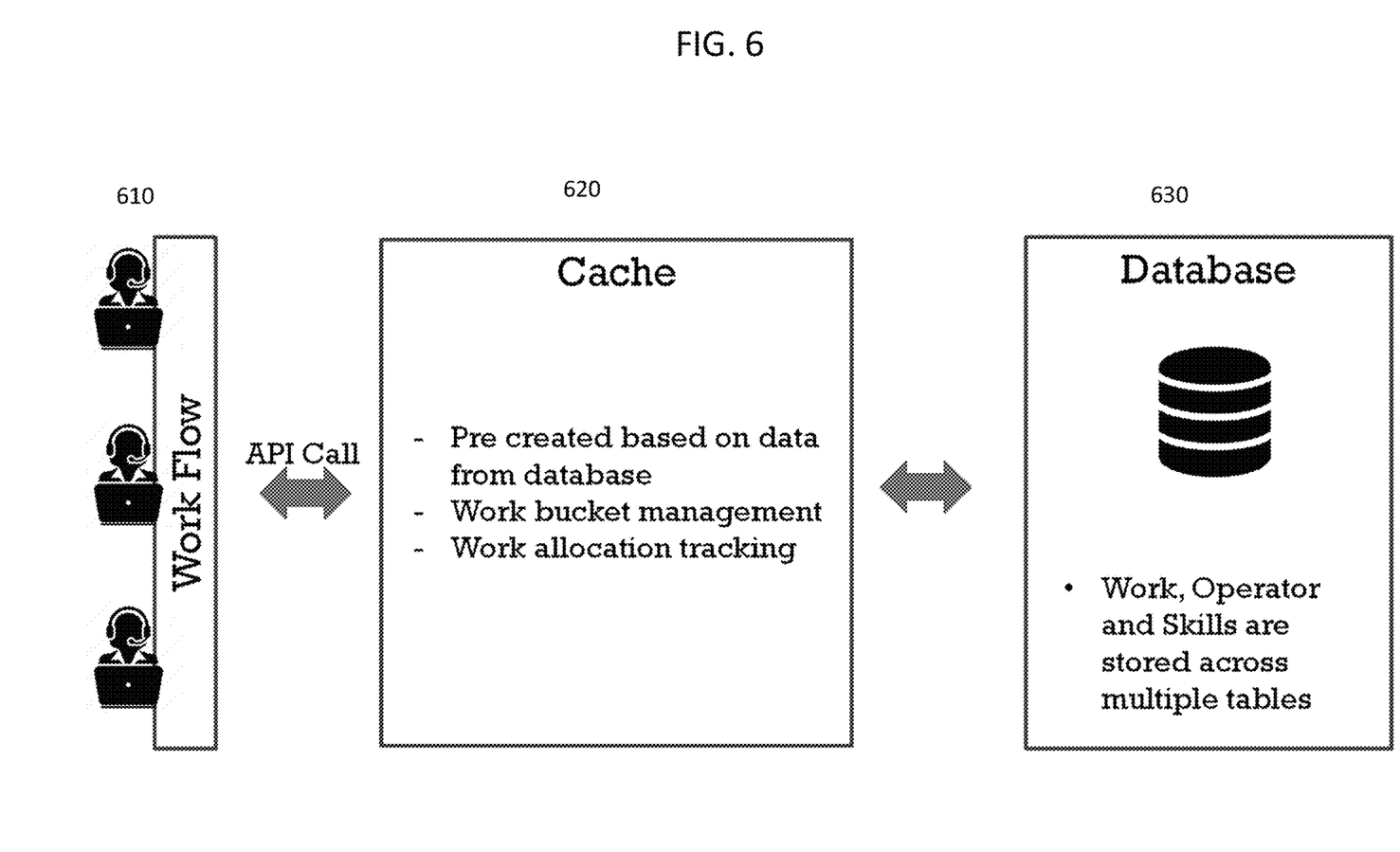
FIG. 6 illustrates a SWA process flow in accordance with an exemplary embodiment.

FIG. 6 illustrates a SWA process flow in accordance with an exemplary embodiment.

According to exemplary aspects, one or more operators 610 may request or receive work assignment by performing an API call with cache 620. The cache 620 may perform communication with a system of network databases 630 for responding to the API call with the one or more operators 610. According to exemplary aspects, the system of network databases 630 may store various information associated with work or case to be assigned across multiple tables. Various information associated with the work or case may include an identifier, service level agreement (SLA)/cutoff, workbasket, one or more skills assigned to the case, unit requesting the work, one or more restrictions and the like. SLA/cutoff may be defined by business controlled tables based on multiple criteria. According to exemplary aspects, SLA/cutoff is expected to be enforced and may require strict adherence to avoid potential downstream impact. Also in an example, work basket may refer to a virtual basket to which a case may be assigned. Skills may include one or more specific skills required for performing the work. In an example, the skills may additionally indicate required level of proficiency, experience and/or efficiency. Unit may indicate one or more units within a line of business for which the work is being requested. Further, one or more restrictions may refer to a restriction present for the work to be assigned.

The system of network databases 630 may additionally store various information associated with workers or operators. Information associated with the workers or operators may include biographic/identifying information of a worker or operator, such as unique operator security identifier, name, age, sex, nationality, citizenship, languages, address, contact information and the like. Worker information may additionally include entitlement information.

According to exemplary aspects, the cache 620 may be pre-created based on data, such as work data and worker data, from the system of network databases 630. Further, the cache 620 may perform work bucket management based on the interaction with the one or more operators 610 and the system of network databases 630. For example, the cache 620 may assign available work or case to one or more work baskets of available operators in view of skill consideration, SLA requirements, work restrictions, worker availability and the like.

In addition to the above, once a case or work is assigned to one of the operators 610, work allocation is tracked to ensure additional work is assigned to an operator that would be able to meet its SLA requirements. Further, if work includes multiple parts requiring different operators to perform, work allocation is tracked to ensure that same operator is unable to be assigned to more than one part of the work.

Figure 7:
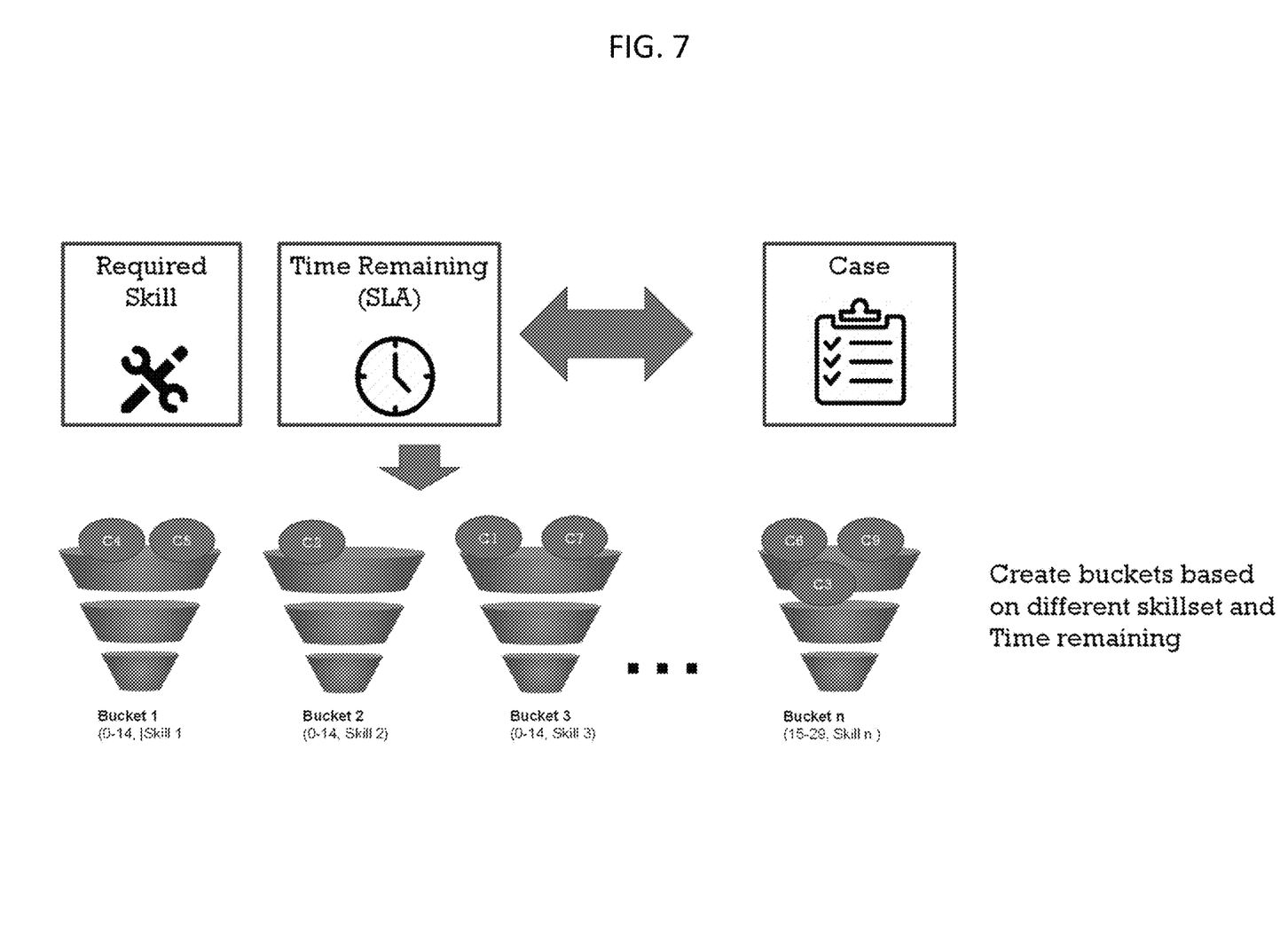
FIG. 7 illustrates a bucket creation process flow in accordance with an exemplary embodiment.

FIG. 7 illustrates a bucket creation process flow in accordance with an exemplary embodiment.

According to exemplary aspects, cases (C1, C2, C3, C4, C5, C6, C7, C8 and C9) may be assigned to one or more work baskets or buckets (Bucket 1, Bucket 2, Bucket 3. . . . Bucket n) of an operator. According to exemplary baskets, the number of work baskets may correspond to the number of skills of the operator. For example, as illustrated in FIG. 7, Bucket 1 may correspond to skill 1 of the operator, Bucket 2 may correspond to skill 2 of the operator, Bucket 3 may correspond to skill 3 of the operator, and Bucket n may correspond to skill n of the operator. Accordingly, an operator of large number of skills may have a large number of buckets that may receive a case or work assignment. Conversely, an operator having small number of skills may have a small number of buckets that may receive a case or work assignment. As exemplarily illustrated in FIG. 7, a case may be assigned to one or more baskets or buckets of an operator in consideration of required skill, SLA requirements and the like.

Figure 8:
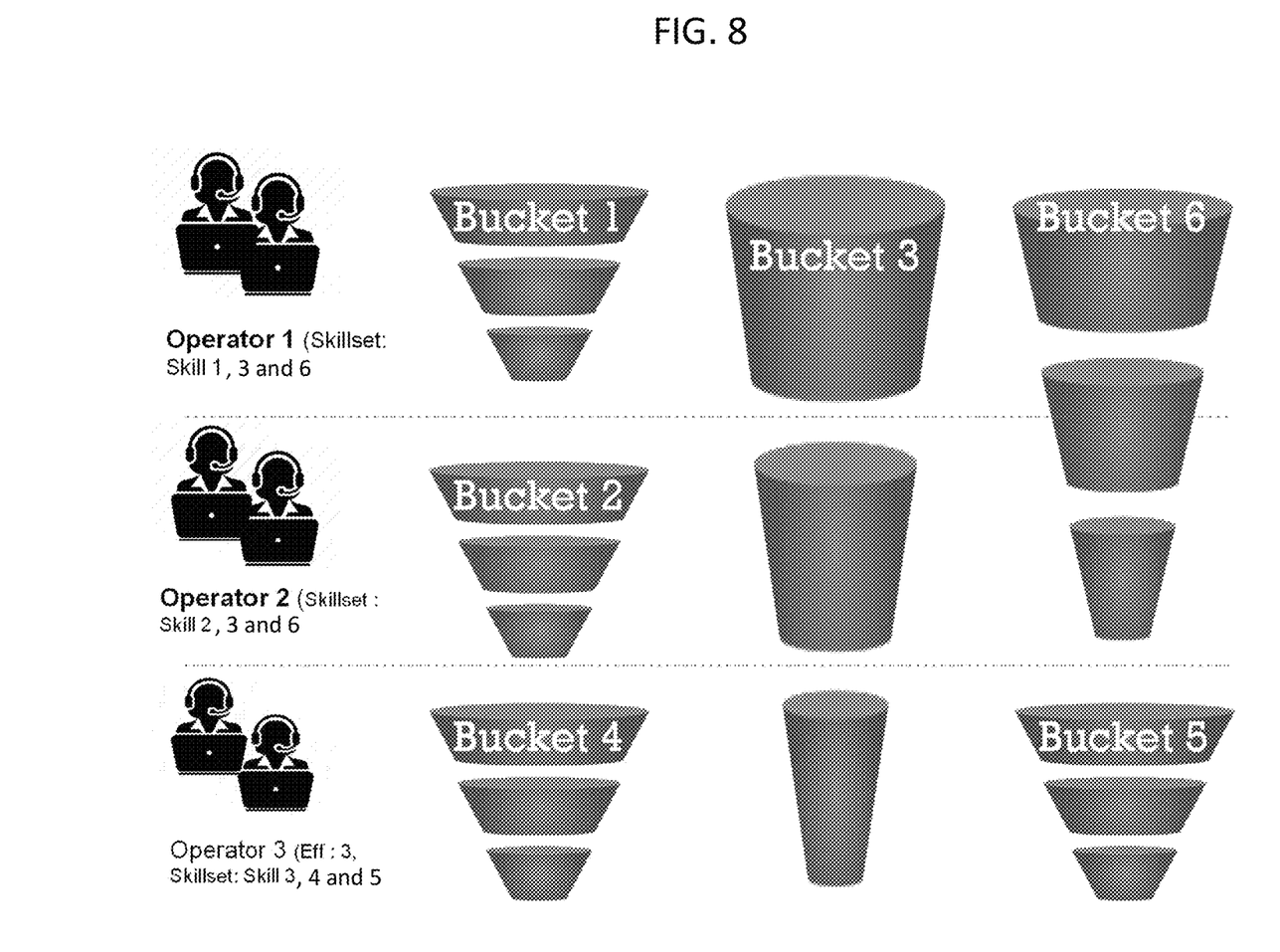
FIG. 8 illustrates a bucket allocation matrix in accordance with an exemplary embodiment.

FIG. 8 illustrates a bucket allocation matrix in accordance with an exemplary embodiment.

According to exemplary aspects, the SWA system may generate and display a bucket allocation matrix. The bucket allocation matrix may illustrate rows of operators along with work buckets corresponding to the each of the operators. As exemplarily illustrated in FIG. 8, Operator 1 shows work bucket 1, bucket 3 and bucket 6 corresponding to skillset 1, 3 and 6 of the Operator 1. Operator 2 shows work bucket 2, bucket 3 and bucket 6 corresponding to skillset 2, 3 and 6 of the Operator 2. Operator 3 shows work bucket 4, bucket 3, and bucket 5 corresponding to skillset 4, 3 and 5 of the Operator 3.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed: rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing automated work assignment, the method comprising:
   receiving, by a processor, information of a case to be assigned;
   storing, in a memory, the received information of the case, wherein the information of the case includes service level agreement (SLA)/cutoff information for avoiding impact to one or more downstream operations, at least one requirement, and at least one restriction;
   storing, in the memory, information of an operator, wherein the information of the operation includes biographic information, entitlement information, and efficiency information with respect to a set of skills;
   retrieving, from the memory, the information of the case and the information of the operator;
   determining, by the processor and based on the retrieved information of the case, the at least one requirement of the case and the at least one restriction of the case;
   determining, using a machine learning algorithm executed by the processor, availability of operator candidates matching the at least one requirement of the case and the at least one restriction of the case in view of the SLA/cutoff information, wherein the operator candidates include the operator;
   dynamically assigning, by the processor, the case to a work bucket of the operator among the operator candidates to the case based on the at least one requirement of the case and the at least one restriction of the case in view of the SLA/cutoff information, wherein the work bucket is a virtual container;
   continuously tracking, by the processor, a progress of the case in view of the SLA/cutoff information and real-time availability of the operator until completion of the case, wherein the real-time availability of the operator is monitored based on scanning of a security badge into a facility;

iteratively determining, by the machine learning algorithm, whether the case is expected to be completed by the SLA/cutoff information based on the continuously tracking of the progress of the case;

reassigning, by the processor, the case to another operator when the machine learning algorithm determines that the operator is unable to complete the case by the SLA/cutoff information to avoid impact to the one or more downstream operations;

capturing, by the processor, a first partial performance of the case by the operator prior to the reassigning and a second partial performance of the case by the other operator subsequent to the reassigning;

iteratively updating, by the processor and in the memory, availability of the case that is assigned based on the continuously tracking of the progress of the case;

determining, by the processor, whether the case is completed;

calculating, by the processor, attributes of the first partial performance of the operator and the second partial performance of the other operator when the case is determined to have been completed;

inputting, by the processor, the calculated attributes of the first partial performance of the operator and the second partial performance of the other operator to the machine learning algorithm; and automatically updating the machine learning algorithm with the calculated attributes of performance for subsequent processing by the machine learning algorithm to more accurately assign assignment of cases for ensuring timely completion for reducing down time to the one or more downstream operations, wherein the automatically updating includes performing unsupervised pattern recognition based on the first partial performance and the second partial performance of the case.

2. The method according to claim 1, further comprising:
monitoring, by the processor, the real-time availability of the operator assigned to the case;
detecting, by the processor, a change in the real-time availability of the operator;
removing, by the processor, assignment of the case from the work bucket of the operator; and
updating the real-time availability of the case for reassignment of the case to the other operator.

3. The method according to claim 1, wherein the at least one requirement of the case is an operator skill.

4. The method according to claim 1, wherein the at least one restriction of the case is a geographic restriction.

5. The method according to claim 1, wherein the at least one requirement of the case is a language.

6. The method according to claim 2, wherein the real-time availability of the operator is further monitored based on online presence.

7. The method according to claim 1, wherein the at least one work bucket includes a plurality of work buckets, each work bucket of the plurality of work buckets correspond to a specific skill of the operator.

8. The method according to claim 1, further comprising:
generating a case allocation matrix based on the assigning of the case to the work bucket; and
displaying, on a display, the generated case allocation matrix.

9. The method according to claim 1, wherein the assigning of the case to the work bucket is performed based on at least the SLA/cutoff information associated with the case.

10. The method according to claim 9, wherein the assigning of the case to the work bucket is further performed based on the real-time availability of the operator.

11. The method according to claim 10, wherein the real-time availability of the operator is further determined based on case load.

12. The method according to claim 10, wherein the real-time availability of the operator is further determined based on geography.

13. The method according to claim 10, wherein the real-time availability of the operator is further determined based on a time zone.

14. The method according to claim 1, wherein the assigning of the case to the work bucket is performed in real-time and in response to a request from the operator.

15. The method according to claim 1, wherein the assigning of the case to the work bucket is performed automatically based on case load distribution.

16. A system to provide for performing automated work assignment, the system comprising:
a memory;
a display; and
a processor configured to perform:
receiving information of a case to be assigned;
storing the received information of the case, wherein the information of the case includes service level agreement (SLA)/cutoff information for avoiding impact to one or more downstream operations, at least one requirement, and at least one restriction;
storing information of an operator, wherein the information of the operation includes biographic information, entitlement information, and efficiency information with respect to a set of skills;
retrieving the information of the case and the information of the operator;
determining, based on the retrieved information of the case, at least one requirement of the case and the at least one restriction of the case;
determining, using a machine learning algorithm, availability of operator candidates matching the at least one requirement of the case and the at least one restriction of the case in view of the SLA/cutoff information, wherein the operator candidates include the operator;
dynamically assigning the case to a work bucket of the operator among the operator candidates to the case based on the at least one requirement of the case and the at least one restriction of the case in view of the SLA/cutoff information, wherein the work bucket is a virtual container;
continuously tracking a progress of the case in view of the SLA/cutoff information and real-time availability of the operator until completion of the case, wherein the real-time availability of the operator is monitored based on scanning of a security badge into a facility;
iteratively determining, via the machine learning algorithm, whether the case is expected to be completed by the SLA/cutoff information based on the continuously tracking of the progress of the case;
reassigning the case to another operator when the machine learning algorithm determines that the operator is unable to complete the case by the SLA/cutoff information to avoid impact to the one or more downstream operations;

capturing a first partial performance of the case by the operator prior to the reassigning and a second partial performance of the case by the other operator subsequent to the reassigning;

iteratively updating availability information of the case that is assigned based on the continuously tracking of the progress of the case;

determining whether the case is completed;

calculating attributes of the first partial performance of the operator and the second partial performance of the other operator when the case is determined to have been completed;

inputting the calculated attributes of the first partial performance of the operator and the second partial performance of the other operator to the machine learning algorithm; and automatically updating the machine learning algorithm with the calculated attributes of performance for subsequent processing by the machine learning algorithm to more accurately assign assignment of cases for ensuring timely completion for reducing down time to the one or more downstream operations, wherein the automatically updating includes performing unsupervised pattern recognition based on the first partial performance and the second partial performance of the case.

17. A non-transitory computer readable storage medium that stores a computer program for performing automated work assignment, the computer program, when executed by a processor, causing a system to perform a plurality of processes comprising:

receiving, by the processor, information of a case to be assigned;

storing, in a memory, the received information of the case, wherein the information of the case includes service level agreement (SLA)/cutoff information for avoiding impact to one or more downstream operations, at least one requirement, and at least one restriction;

storing, in the memory, information of an operator, wherein the information of the operation includes biographic information, entitlement information, and efficiency information with respect to a set of skills;

retrieving, from the memory, the information of the case and the information of the operator;

determining, by the processor and based on the retrieved information of the case, at least one requirement of the case and the at least one restriction of the case;

determining, using a machine learning algorithm executed by the processor, availability of operator candidates matching the at least one requirement of the case and the at least one restriction of the case in view of the SLA/cutoff information, wherein the operator candidates include the operator;

dynamically assigning, by the processor, the case to a work bucket of the operator among the operator candidates to the case based on the at least one requirement of the case and the at least one restriction of the case in view of the SLA/cutoff information, wherein the work bucket is a virtual container;

continuously tracking, by the processor, a progress of the case in view of the SLA/cutoff information and real-time availability of the operator until completion of the case, wherein the real-time availability of the operator is monitored based on scanning of a security badge into a facility;

iteratively determining, by the machine learning algorithm, whether the case is expected to be completed by the SLA/cutoff information based on the continuously tracking of the progress of the case;

reassigning, by the processor, the case to another operator when the machine learning algorithm determines that the operator is unable to complete the case by the SLA/cutoff information to avoid impact to the one or more downstream operations;

capturing, by the processor, a first partial performance of the case by the operator prior to the reassigning and a second partial performance of the case by the other operator subsequent to the reassigning;

iteratively updating, by the processor and in the memory, availability of the case that is assigned based on the continuously tracking of the progress of the case;

determining, by the processor, whether the case is completed;

calculating, by the processor, attributes of the first partial performance of the operator and the second partial performance of the other operator when the case is determined to have been completed; inputting, by the processor, the calculated attributes of the first partial performance of the operator and the second partial performance of the other operator to the machine learning algorithm; and automatically updating the machine learning algorithm with the calculated attributes of performance for subsequent processing by the machine learning algorithm to more accurately assign assignment of cases for ensuring timely completion for reducing down time to the one or more downstream operations, wherein the automatically updating includes performing unsupervised pattern recognition based on the first partial performance and the second partial performance of the case.

* * * * *